United States Patent
Verweyen

(10) Patent No.: US 8,096,503 B2
(45) Date of Patent: Jan. 17, 2012

(54) STRUCTURING CONSTRUCTION FOR AN AIRCRAFT FUSELAGE

(75) Inventor: Hendrik Verweyen, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 695 days.

(21) Appl. No.: 12/161,042

(22) PCT Filed: Jan. 5, 2007

(86) PCT No.: PCT/EP2007/000072
§ 371 (c)(1), (2), (4) Date: Aug. 19, 2008

(87) PCT Pub. No.: WO2007/082644
PCT Pub. Date: Jul. 26, 2007

(65) Prior Publication Data
US 2010/0148003 A1 Jun. 17, 2010

(30) Foreign Application Priority Data
Jan. 17, 2006 (DE) .................. 10 2006 002 248

(51) Int. Cl.
*B64C 1/00* (2006.01)
(52) U.S. Cl. ............ 244/119; 244/117 R; 244/120; 244/123.1; 244/123.14; 244/123.2; 244/123.8; 244/123.9
(58) Field of Classification Search .......... 244/117 R, 244/119, 120, 123.1, 123.14, 123.2, 123.8, 244/123.9
See application file for complete search history.

(56) References Cited

U.S. PATENT DOCUMENTS

| | | | |
|---|---|---|---|
| 1,966,933 A | | 7/1934 | Ragsdale |
| 3,867,244 A | * | 2/1975 | Adams ................. 244/119 X |
| 3,962,506 A | * | 6/1976 | Dunahoo ............. 244/123.14 X |
| 4,025,996 A | * | 5/1977 | Saveker ............... 244/123.1 X |
| 4,635,882 A | * | 1/1987 | SenGupta et al. ........ 244/119 |
| 4,786,015 A | * | 11/1988 | Niggemann ........... 165/184 X |
| 4,916,027 A | * | 4/1990 | DelMundo ............ 244/119 X |
| 5,165,627 A | * | 11/1992 | Amano et al. ............ 244/119 |
| 5,171,150 A | | 12/1992 | Levy |
| 5,171,510 A | | 12/1992 | Barquet et al. |
| 5,472,760 A | * | 12/1995 | Norvell ................ 244/119 X |

(Continued)

FOREIGN PATENT DOCUMENTS
EP 1 439 121 7/2004
(Continued)

OTHER PUBLICATIONS
International Search Report, dated Jun. 11, 2007.
(Continued)

*Primary Examiner* — Rodney B White
(74) *Attorney, Agent, or Firm* — Carter DeLuca Farrell & Schmidt LLP

(57) ABSTRACT

A structuring construction for an aircraft fuselage is provided having an outer skin as well as a plurality of formers extending at a spacing side by side crosswise to the longitudinal direction of the fuselage wherein at least a partial number of the formers include a main former portion which is channel-like in cross section and the channel edges of which are adjacent to the outer skin and wherein the channel space of the main former portion serves to accommodate at least one supply air line which may be formed, for example, by a separate pipe line.

15 Claims, 2 Drawing Sheets

U.S. PATENT DOCUMENTS

Figure 1:
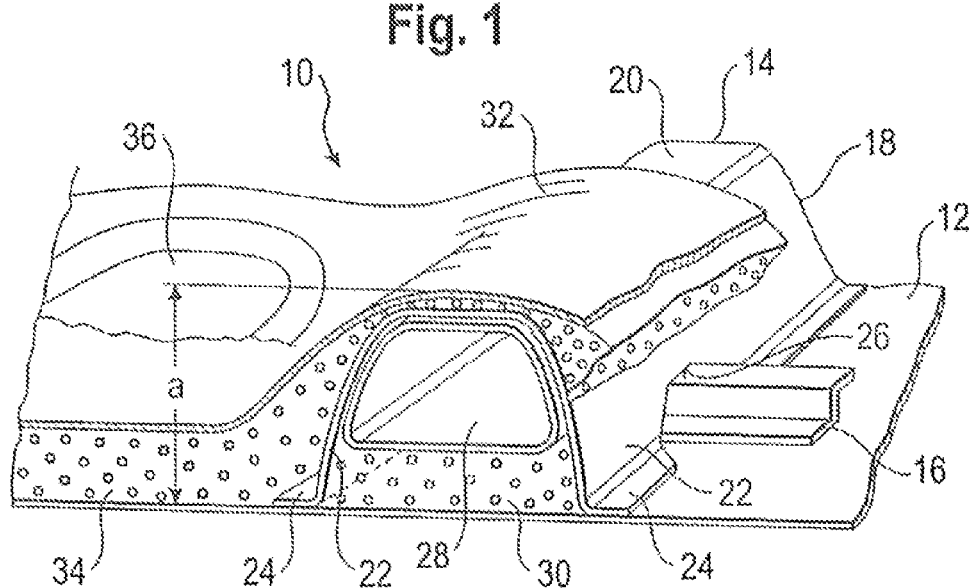

| | | | |
|---|---|---|---|
| 5,577,688 A * | 11/1996 | Sloan | |
| 5,611,504 A * | 3/1997 | Haynes et al. | 244/119 |
| 6,655,633 B1 * | 12/2003 | Chapman, Jr. | 244/123.9 |
| 6,676,077 B1 | 1/2004 | DiChiara et al. | 244/117 R |
| 6,746,755 B2 * | 6/2004 | Morrison et al. | 244/123.14 X |
| 7,074,474 B2 * | 7/2006 | Toi et al. | 244/119 X |
| 7,210,611 B2 * | 5/2007 | Sanders et | 244/117 R X |
| 7,293,737 B2 * | 11/2007 | Engwall et al. | 242/590 |
| 7,530,530 B2 * | 5/2009 | Engwall et al. | 244/119 |
| 7,861,969 B2 * | 1/2011 | Guzman et al. | 244/120 |
| 7,871,040 B2 * | 1/2011 | Lee et al. | 244/119 |
| 2003/0042364 A1 * | 3/2003 | Tanaka et al. | 244/123 |
| 2005/0044712 A1 | 3/2005 | Gideon et al. | |
| 2005/0211838 A1 * | 9/2005 | Struve et al. | 244/119 |
| 2005/0211839 A1 * | 9/2005 | Movsesian et al. | 244/119 |
| 2005/0211843 A1 * | 9/2005 | Simpson et al. | 244/119 |
| 2005/0230552 A1 * | 10/2005 | Engwall et al. | 244/133 |
| 2007/0095982 A1 * | 5/2007 | Kismarton et al. | 244/119 |
| 2007/0102839 A1 * | 5/2007 | McGowan et al. | 244/119 X |
| 2008/0029644 A1 * | 2/2008 | Martinez Cerezo et al. | 244/119 |
| 2008/0111024 A1 * | 5/2008 | Lee et al. | 244/119 X |
| 2008/0290214 A1 * | 11/2008 | Guzman et al. | 244/119 |
| 2009/0194636 A1 * | 8/2009 | Childs | 244/123.8 |
| 2009/0283638 A1 * | 11/2009 | Arevalo Rodriguez et al. | 244/119 |
| 2010/0230542 A1 * | 9/2010 | Childs | 244/123.1 |
| 2010/0318243 A1 * | 12/2010 | Lewis et al. | 244/119 X |
| 2010/0320319 A1 * | 12/2010 | Liguore et al. | 244/119 |
| 2011/0073708 A1 * | 3/2011 | Biornstad et al. | 244/119 X |

FOREIGN PATENT DOCUMENTS

| | | |
|---|---|---|
| EP | 1 510 454 | 3/2005 |
| GB | 127 943 | 6/1919 |
| GB | 559 954 | 3/1944 |
| GB | 2 134 059 | 8/1984 |
| WO | 2006001860 | 1/2006 |

OTHER PUBLICATIONS

English translation of Chinese Office Action date May 6, 2010.
English translation of Chinese Office Action dated Apr. 29, 2011.

* cited by examiner

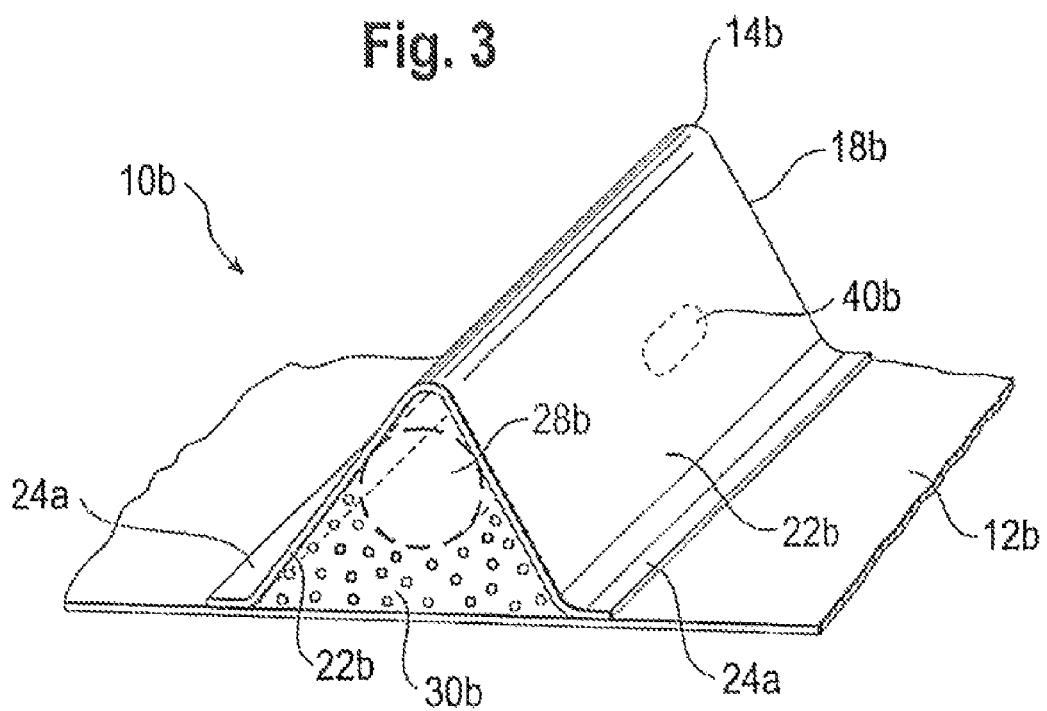

STRUCTURING CONSTRUCTION FOR AN AIRCRAFT FUSELAGE

The invention relates to a structuring construction for an aircraft fuselage.

In today's commercial aircraft the parts of an aircraft fuselage which form the structure comprise an outer skin which is often composed of multiple layers as well as a stiffening framework disposed on the inside of the skin and consisting of strips or struts extending in the longitudinal direction of the fuselage and in the lateral direction of the fuselage. The longitudinal struts are also called stringers in professional circles, while the lateral struts are frequently called formers.

Where passenger aircraft are concerned, a good view of the outside for air passengers is as a rule considered to be pleasant and desirable. A comfortable cabin is therefore one of the most important sales arguments for passenger aircraft. The aim is therefore to fit as much window area as possible into the fuselage. Windows can only be fitted between formers, with the window width being defined by the former spacing. However the spacing between adjacent formers cannot be of any desired size, as these are responsible for the stiffness of the fuselage in the lateral direction and their maximum spacing is determined by the strength requirements of the fuselage.

The object of the invention is to indicate a structural construction for an aircraft fuselage which enables the window width to be increased.

With regard to achieving this object, the invention starts out from a structuring construction for an aircraft fuselage with an outer skin and a plurality of formers extending at a spacing side by side crosswise to the longitudinal direction of the fuselage, wherein, according to the invention, at least a partial number of the formers comprise a main former portion which is channel-like in cross section and the channel edges of which are adjacent to the outer skin. On account of the channel-like configuration of the main former portion, the former has two walls which extend at a spacing from one another, in each case form one of the channel side flanks and in each case can be joined to the outer skin in the region of their ends which are remote from the channel bottom, for example by welding, riveting, gluing or laminating. This "double-walled" construction of the former can stiffen the outer skin to a greater extent than a conventional single-walled former (for example Z- or I-shaped in cross section), which can only be joined to the outer skin along a line or a former wall. In consequence of the greater stiffening effect, the spacing between adjacent formers can be increased, whereby fewer formers per given fuselage length are required overall than in the case of conventional single-walled formers. On account of the possible increase in spacing between adjacent formers, more space can be provided for windows, which can accordingly be of a wider construction and therefore increase the sense of well-being of the air passengers.

As a result of the channel-like configuration of the main former portion, room is additionally afforded in the channel space for accommodating components which would otherwise have to be accommodated between the formers and would therefore reduce the space available for fitting windows. It is in particular risers of an air conditioning system which are under consideration here. The air conditioning system usually comprises an extensive system of air lines by means of which supply air is distributed over the aircraft and delivered to the different air outlets, via which the conditioned supply air is blown into the cabin. A part of this air line system is constituted by risers which are installed in the fuselage construction, extend along the formers and allow the supply air to be distributed in a plane crosswise to the longitudinal direction of the fuselage, in particular from the bottom upwards, as a substantial part of the supply air is typically blown into the cabin in the upper cabin region. According to one preferred development of the invention, at least one air line serving to convey supply air is therefore disposed or formed in the space between the main former portion and the outer skin at least in the case of a partial number of the formers constructed with a channel-like main former portion.

The air line may be formed by a separate pipe line or defined at least in part by the actual former, in particular by the channel-shaped main portion of the former. When the air line is defined at least in part by the former, at least one line-defining wall can be produced separately from the former, although firmly joined to this. It is even conceivable to form all boundary walls of the air line integrally with the former.

In order to minimise the influence of the outer skirl, which is very cold during flight, on the moderation of the temperature of the supply air conveyed in the air line, it is advisable to dispose an at least thermally insulating material arrangement between the outer skin and the air line. The material arrangement may also have sound-insulating properties in order to minimise the annoyance caused by noise to air passengers.

If the air line is formed by a separate pipe line, an at least thermally insulating material arrangement may be provided between the air pipe line and the former. However, if the former is made of a material of low thermal conductivity, it is conceivable to dispense with thermal insulation through additional material between the former and the pipe line. In this case the air pipe line may even lie against the former, at least in parts.

One or a plurality of stringer(s) may pass through apertures in the channel side flanks of the main former portion. It may in this case be of advantage to ensure that there is no contact between the stringers and the air line, in particular if the stringers consist of a material of high thermal conductivity, for example based on aluminium.

For the purpose of a low weight, it is of advantage to make at least the main former portion from a fibre-reinforced, in particular carbon fibre-reinforced plastics material. A material of this kind is also distinguished by particularly low thermal conductivity, which complies with the concept of accommodating air lines for conditioned supply air in the immediate vicinity of the formers. In order to achieve good thermal isolation between the air lines and the formers, it may also suffice to make the formers from a base material of a higher thermal conductivity, for example based on aluminium, although to coat it at least in regions with a fibre-reinforced, in particular carbon fibre-reinforced plastics material. A coating of this kind may then be provided in particular on the inside of the channel-shaped main former portion.

The air line may have an approximately circular cross section. It is of course equally conceivable for the air line to have a cross-sectional shape which differs from a circle. It is in particular possible to use an air pipe line which is adapted in cross section at least approximately to the path of the contour of the channel side flanks or/and of the channel bottom of the main former portion. Through this kind of close fit to the contour of the main former portion, it is possible to reach a good compromise between the pipe cross-sectional area and the former width and height. For a certain minimum pipe size is required for sufficient flow rates in the latter, although this should not of course result in an excessive former size. The available channel space can be put to optimum use by adapting the cross-sectional shape of the pipe to the path of the contour of the main former portion.

Fastening portions directed away from one another are expediently disposed at the channel edges of the main former portion to fasten the former to the outer skin.

The main former portion may comprise a bottom wall and two mutually opposite side walls, joined to the bottom wall, like a U-shape in cross-section. A different shape of the main former portion is of course also conceivable, for example an approximately V-shape, in which case there is no actual bottom wall and the channel bottom is then formed by the tip of the V. Generally speaking, any cross-sectional shape of the main former portion which provides a channel-shaped cross section is conceivable within the scope of the invention. For example, apart from the above-mentioned U- or V-cross-sectional shapes, semicircular, trapezoidal or rectangular cross-sectional shapes of the main former portion are also conceivable.

At least one opening, bordered on all sides, may be formed in at least one of the walls of the main former portion. Openings of this kind may serve, for example, to pass through air pipe lines, although they may also allow access to the channel space of the formers for maintenance or test purposes. Openings which are not used may be closed by a detachable cover.

Figure 2:
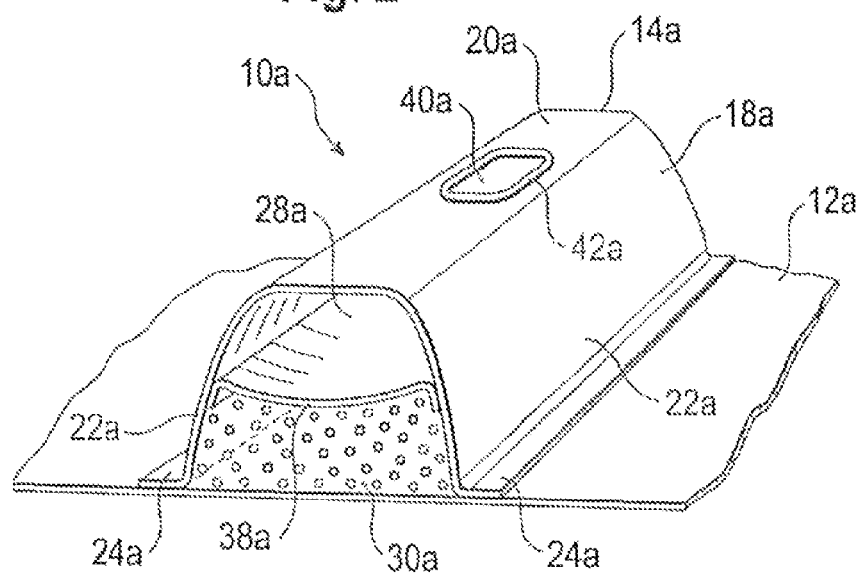

The invention is illustrated in detail in the following on the basis of the accompanying drawings, in which:

FIG. 1 represents a first embodiment of a structural construction according to the invention for an aircraft fuselage, FIG. 2 represents a second embodiment of a structural construction according to the invention, and FIG. 3 represents a third embodiment of a structural construction according to the invention.

FIG. 1 shows in a partly sectional, perspective representation a detail of an aircraft fuselage with a structuring construction according to a first embodiment of the invention. The fuselage detail which is shown—generally designated by 10—has an outer skin 12, formers 14 as well as stringers 16. Only one of the formers 14 and the stringers 16 is in each case represented in FIG. 1; it is understood that the aircraft fuselage may comprise overall a multiplicity of formers 14 and stringers 16 in each case disposed at spacings side by side. The formers 14 extend crosswise to the longitudinal direction of the fuselage, while the stringers 16 are disposed along the longitudinal direction of the fuselage. Aluminium, aluminium alloys and carbon fibre-reinforced plastics materials, for example, are possible materials for the outer skin 12, the formers 14 and the stringers 16. It is conceivable for the outer skin 12 to be made of a material which is based on aluminium, while at least some of the stiffening struts formed by the formers 14 and the stringers 16 are made of a carbon fibre-reinforced plastics material. At least the formers 14 are preferably made of a plastics material of this kind. The formers 14 and the stringers 16 are joined to the outer skin 12 in a manner which is not represented, for example by riveting or welding. As is known per se, clips, which are not represented in detail, may join the formers 14 and the stringers 16 together.

At least a partial number of the formers 14 are of the form which is shown in FIG. 1. It is not necessary for all the formers of the fuselage to have this form; it is conceivable for a partial number of the formers to be configured differently.

The former 14 which is shown in FIG. 1 has a channel-shaped main former portion 18 which faces the outer skin 12 with its channel opening and the channel edges of which are adjacent to the outer skin 12. If considered in cross section, the main former portion 18 is approximately U-shaped, comprising a bottom wall 20 as well as two mutually opposite side walls 22 which adjoin the bottom wall 20. The bottom wall 20 is comparatively plane, while the side walls 22 are arched slightly away from one another. A respective integrally adjoining fastening portion 24, which points outwards from the channel interior, is provided at the ends of the side walls 22 which are remote from the bottom wall, which portion serves to fasten the former 14 to the outer skin 12. Rivets which firmly join the former 14 to the outer skin 12 may be inserted in the fastening portions 24, for example.

An aperture 26, through which the stringer 16 concerned passes, is in each case formed into the side walls 22 of the former 14 at the points where a stringer 16 crosses the former 14. According to the example of FIG. 1, the stringers 16 may be formed by profiled strips of an approximately Z-shaped cross section; their height is substantially less than that of the formers 14, so that a sufficient free space for the provision of an air line remains in the channel space of the formers 14 above the stringers 16. An air line of this kind is formed in FIG. 1 by a pipe line 28 whose cross-sectional shape approximates the path of the contour of the bottom wall 20 and the side walls 22 of the main former portion 18. The pipe line 28 may lie on the stringer 16; however there is preferably no contact between the pipe line 28 and the stringer 16, in which case this freedom from contact can be guaranteed by a packing of insulating material 30 which is inserted between the outer skin 12 and the pipe line 28. The insulating properties of the material packing 30 are at least of a thermal nature; the material packing 30 preferably also affords sound insulation which helps to maintain a low noise level in the aircraft cabin. Freedom from contact between the pipe line 28 and the stringer 16 is a particular aim if the stringer 16 is made of a material of high thermal conductivity, such as aluminium or an aluminium alloy, for example. In this case it is advisable to prevent a cold bridge between the stringer 16 and the pipe line 28, so as not to impair the moderation of the temperature of the supply air conveyed in the pipe line 28. The material packing 30 may here serve as a support for the pipe line 28 and guarantee a sufficient spacing between the pipe line 28 and the stringer 16.

If the former 14 is made of a material of low thermal conductivity, in particular a carbon fibre-reinforced plastics material, it is possible to dispense with special measures for thermally isolating the pipe line 28 from the walls of the main former portion 18. Therefore, in the embodiment of FIG. 1, the material packing 30 does not extend between the pipe line 28 and the side walls 22 as well as the bottom wall 20 of the main former portion 18. According to this embodiment, the pipe line 28 may lie directly against the bottom wall 20 or/and the side walls 22, in which case the material packing 30 can guarantee a certain system pressure and the approximation of the pipe cross-sectional shape to the path of the contour of the main former portion 18 can ensure that the pipe line 28 is securely positioned substantially without wobbling in the channel space of the former 14. Fastening means which secure the pipe line 28 to the walls of the main former portion 18 may be provided as an alternative or in addition. It is conceivable, for example, to glue the pipe line 28 to the bottom wall 20 or/and the side walls 22.

If, however, there is no guarantee that the cold outside temperature occurring during flight cannot be transmitted via the outer skin 12 to the former 14, it is advisable also to extend the material packing 30 into the region between the pipe line 28 and the walls 20, 22 of the main former portion 18, so that the pipe line 28 is then embedded all round in the material packing 30.

The pipe line 28 forms a riser of an air conditioning system of the aircraft. Risers of this kind enable conditioned supply air to be distributed in a plane crosswise to the longitudinal direction of the fuselage. For example, the pipe line 28 which is shown in FIG. 1 can be extended into the upper cabin regions of the aircraft cabin and coupled here to one or a plurality of cabin air outlet(s), via which the supply air is blown into the cabin. It is understood that not all the channel-shaped formers 14 of the aircraft fuselage have to be used to accommodate a supply air line. It is also understood that it is possible to form not just one single supply air line, but also two or more supply air lines in the channel space of a former 14, For this purpose, in a modification of FIG. 1, it is possible to accommodate two or more pipe lines of this kind in the channel space instead of one pipe line 28. An alternative possibility for forming one or more supply air line(s) while dispensing with separate pipe lines is explained in the following in conjunction with FIG. 2.

The spacing of the side walls 22 from one another as well as the spacing of the bottom wall 20 from the outer skin 12 are adapted for a necessary minimum cross-sectional size of the supply air line formed by the pipe line 28. The pipe line 28 should not be too small, as excessive pressure losses could otherwise occur along the pipe line 28. The flow speed of the air which is conveyed in the pipe line 28 should also not be too high for acoustic reasons. On the other hand, however, it must be possible for the pipe line 28 to guarantee a certain flow rate. These requirements result in a certain minimum cross-sectional size of the pipe line 28. The channel space existing between the bottom wall 20 and the side walls 22 must be dimensioned accordingly in order to enable one or a plurality of supply air line(s) of the desired cross-sectional area to be accommodated therein. An optimisation between former width and former height may in this case be required, for, with given external fuselage dimensions, an excessive former height reduces the available cabin space, while an excessive former width may limit the space available between adjacent formers for fitting windows.

The fuselage construction is closed off towards the cabin interior by an inner covering 32, under which an insulating material arrangement 34 is disposed, the latter filling the space between the covering 32 and the outer skin 12. It can be seen that in the example of FIG. 1 the insulating material arrangement 34 which, similarly to the insulating material 30, guarantees at least thermal insulation, if desired also sound insulation, is reduced in thickness over the formers 14, so that the inner covering 32 extends at a small spacing over the bottom wall 20 of the formers 14. A reduction in thickness of this kind of the insulating material arrangement 34, which is formed, for example, by an insulating foam, is in particular possible if the transport of cold from the outer skin 12 via the former 14 to the inner covering 32 is significantly restricted by using materials of a low thermal conductivity. As has already been mentioned, the former can as a whole be made of a carbon fibre-reinforced plastics material for this purpose; it is also conceivable to produce the former 14 from a base material of a higher thermal conductivity, although to provide it at least in regions with a coating of a low thermal conductivity. A coating of this kind may consist, for example, of a carbon fibre-reinforced plastics material. It is conceivable, for example, to provide the bottom wall 20 and at least parts of the side walls 22 of the former 14 with a coating of this kind on the inside and/or outside.

Since a transfer of cold via the former 14 into the cabin interior is restricted or prevented by an appropriate choice of material as mentioned above, a comparatively thin layer of insulating material may be sufficient between the top side of the former, i.e. the bottom wall 20, and the inner covering 32 in order to achieve good thermal partitioning of the cabin overall. This has the advantage of enabling the maximum thickness of the fuselage wall—designated by a in FIG. 1—to be kept comparatively small, which has a favourable effect on the available space in the cabin.

A window fitted in the fuselage is indicated at 36 in FIG. 1.

In the embodiments of FIGS. 2 and 3 the same or equivalent components are given the same reference numbers as in FIG. 1, although are supplemented by a small letter. Unless indicated otherwise in the following, the above statements are referred to for an illustration of these components.

An air line 28a is formed in the channel space of the former 14a in the variant of FIG. 2, which line, unlike the embodiment of FIG. 1, is not formed by a separate pipe line, but rather by the bottom wall 20a and the side walls 22a of the main former portion 18a as well as by a boundary wall 38a, which extends at a spacing from the outer skin 12a between the two side walls 22a. In the example of FIG. 2 the boundary wall 38a is a part which is produced separately from the main former body 18a and is firmly and tightly joined to the side walls 22a by gluing or welding, for example. It is also conceivable for the boundary wall 38a to be integral with the main former portion 18a, in particular if the former 14a is produced by means of a pultrusion process.

If not just one air line 28a is provided in the channel space of the former 14a, but rather two or more, it is conceivable to introduce further boundary walls which may extend, for example, between the bottom wall 20a and the boundary wall 38a.

FIG. 2 also shows an opening 40a which is formed in the bottom wall 20a and is tightly closed by a cover 42a. The air line 28a is accessible via the opening 40a, for example for maintenance work or during assembly. It is understood that a plurality of openings 40a of this kind may be provided in the bottom wall 20a or/and in one or both of the side walls 22a. Openings of this kind may also be used to connect the air line 28a extending in the channel space of the former 14a to adjacent parts of the air conditioning system. For example, the connection to cabin air outlets, via which the supply air is blown into the cabin may be established through openings of this kind.

In the variant of FIG. 3 the former 14b comprises a main former portion 18b with an approximately V-cross section. In a configuration of this kind of the former the channel bottom is formed in the region of the tip of the V; a bottom wall as provided in the embodiments of FIGS. 1 and 2 is absent in the case of the former 14b of FIG. 3.

FIG. 3 also shows, indicated by a broken line, a pipe line 28b with a circular cross section which can be supported at the side walls 22b of the main former portion 18b. Also indicated by a broken line is an opening 40b in one of the side walls 22b. If the opening 40b is appropriately dimensioned, it can be used for the passage of the pipe line 28b, for example. It is also conceivable to pass a connection pipe which is joined to the pipe line 28b through the opening 40b.

The invention claimed is:

1. Structuring construction for an aircraft fuselage of an aircraft, comprising:
    an outer skin; and
    a plurality of formers extending at a spacing side by side crosswise to the longitudinal direction of the fuselage, wherein at least a partial number of the formers include a main former portion formed as a channel in cross section, channel edges of which are adjacent to the outer skin,
    wherein at least one air line forming a riser of an air conditioning system of the aircraft and serving to convey supply air to an aircraft cabin of the aircraft is disposed or formed in a space between the main former portion and the outer skin at least in the formers constructed as the main former portions.

2. Structuring construction according to claim 1, wherein the air line is formed by a separate pipe line.

3. Structuring construction according to claim 2, wherein an at least thermally insulating material arrangement is disposed between the former and the air pipe line.

4. Structuring construction according to claim 2, wherein the air pipe line lies against the former, at least in parts.

5. Structuring construction according to claim 2, wherein the air pipe line is adapted in cross section at least to the path of a contour of channel side flanks or/and of a channel bottom of the main former portion.

6. Structuring construction according to claim 1, wherein the air line is defined at least in part by the former.

7. Structuring construction according to claim 1, wherein an at least thermally insulating material arrangement is disposed between the outer skin and the air line.

8. Structuring construction according to any one of claim 1, wherein at least one stringer extending in the longitudinal direction of the fuselage passes through apertures in two channel side flanks of the main former portion and crosses the air line without contact.

9. Structuring construction according to claim 1, wherein at least the main former portion is made of a carbon fibre-reinforced plastics material or is coated with a carbon fibre-reinforced plastics material, at least in regions.

10. Structuring construction according to any one of claims 1 to 9, wherein the main former portion has a cross-sectional shape which is U-shape, V- shaped, semicircular, trapezoidal, or rectangular.

11. Structuring construction according to claim 1, wherein fastening portions directed away from one another are disposed at the channel edges of the main former portion to fasten the former to the outer skin.

12. Structuring construction according to claim 1, wherein the main former portion comprises a bottom wall and two mutually opposite side walls, joined to a bottom wall, like a U-shape in cross section.

13. Structuring construction according to claim 1, wherein at least one opening, bordered on all sides, is formed in at least one wall of the main former portion.

14. Structuring construction according to claim 1, wherein at least the main former portion is coated in regions with a carbon fibre-reinforced plastics material.

15. Structuring construction according to claim 1, wherein the main former portion includes two walls which extend at a spacing from one another to form channel side flanks joined to the outer skin.

* * * * *